UNITED STATES PATENT OFFICE.

GEORGE W. MILES, OF SANDWICH, MASSACHUSETTS, ASSIGNOR TO AMERICAN CELLULOSE AND CHEMICAL MANUFACTURING COMPANY, LTD., OF NEW YORK, N. Y., A CORPORATION OF DELAWARE.

COMPOSITION OF CELLULOSE ACETATE WITH THE FATTY ACIDS OF COCOANUT-OIL.

1,357,335. Specification of Letters Patent. Patented Nov. 2, 1920.

No Drawing. Application filed June 30, 1919. Serial No. 307,765.

*To all whom it may concern:*

Be it known that I, GEORGE W. MILES, a citizen of the United States, and resident of Sandwich, Massachusetts, in the county of Barnstable and State of Massachusetts, have invented new and useful Improvements in Composition of Cellulose Acetate with the Fatty Acids of Cocoanut-Oil, of which the following is a specification.

My invention consists of a new composition of matter, which may be used in divers ways, for instance as a coating material, film forming material, or as a substance to be cast or molded into shapes.

The composition consists of cellulose acetate with that complex of fatty acids which are extractable from cocoanut oil.

In order to confer on cellulose acetate sundry valuable physical properties, such as flexibility and toughness, manifested when the acetate is to be used in film-form (as for photographic films, or as coatings or varnishes) or plasticity, to be utilized in molding the acetate in sundry shapes, as a substitute for celluloid, or pliability and tensile strength, of value when extended filaments of the acetate are to be employed as artificial silk, many expedients have been attempted and invented. Substances miscible with cellulose acetate in solutions thereof, have been discovered to confer various properties upon the final article of manufacture or to improve the acetate-product in respect to various physical properties already known to be possessed by it. So far as I know, the progress in such directions has been by purely empirical methods, since the agent which produces a given effect when combined with cellulose acetate appears to be in each case unique in the special result produced. In nearly, if not quite all, the instances where modifying agents or solvents have been used to produce peculiar physical properties or adaptabilities in cellulose acetate, the solvent, softener, or other miscible substance is operative over a limited range of physical condition, particularly in respect to the cellulose acetate solution itself. Some are characterized by limitation to comparatively thin and fluid solutions, others appear to be effective only to produce thick jellies with cellulose acetate. All these phenomena point to the unique function and limited range of operation of the respective modifying agents or solvents.

The peculiar composition which I have discovered consists essentially of cellulose acetate and the complex of fatty acids extractable from cocoanut oil, which taken as a unique integer, have the effect of producing, with cellulose acetate in a suitable volatile solvent, a composition which may be varied in physical constitution through the entire range between a thin liquid, hardly more viscous than the acetate solution in its volatile solvent, to a jelly. Between these widely separated limits the aggregate of the fatty acids extractable as a whole from cocoanut oil may be used in variable proportions, and are equally miscible with the cellulose acetate solution.

Sundry fatty acids and acetylated fatty acids have been tried in composition with cellulose acetate, these fail to remain incorporated with the acetate, but exude or issue therefrom upon evaporation of the volatile solvent. The aggregate of cocoanut oil fatty acids, employed as an integral factor, is free from this defect, even when used in large relative proportions, even to three times the weight of the cellulose acetate; and in this important respect the performance of the said aggregate of fatty acids is unique so far as I am informed. When the volatile constituent is allowed to evaporate, the residue is a water-insoluble substance, easily cut, flexible when thin, capable of film-extension to a condition of tenuity.

What I claim and desire to secure by Letters Patent is:

1. Cellulose ester composition, consisting of cellulose acetate and the aggregate of fatty acids extractable from cocoanut oil.

2. Cellulose ester composition, consisting of cellulose acetate, a volatile solvent thereof, and the aggregate of fatty acids extractable from cocoanut oil.

Signed by me at Boston, Massachusetts, this 25 day of June, 1919.

GEORGE W. MILES.